United States Patent Office 3,231,220
Patented Jan. 25, 1966

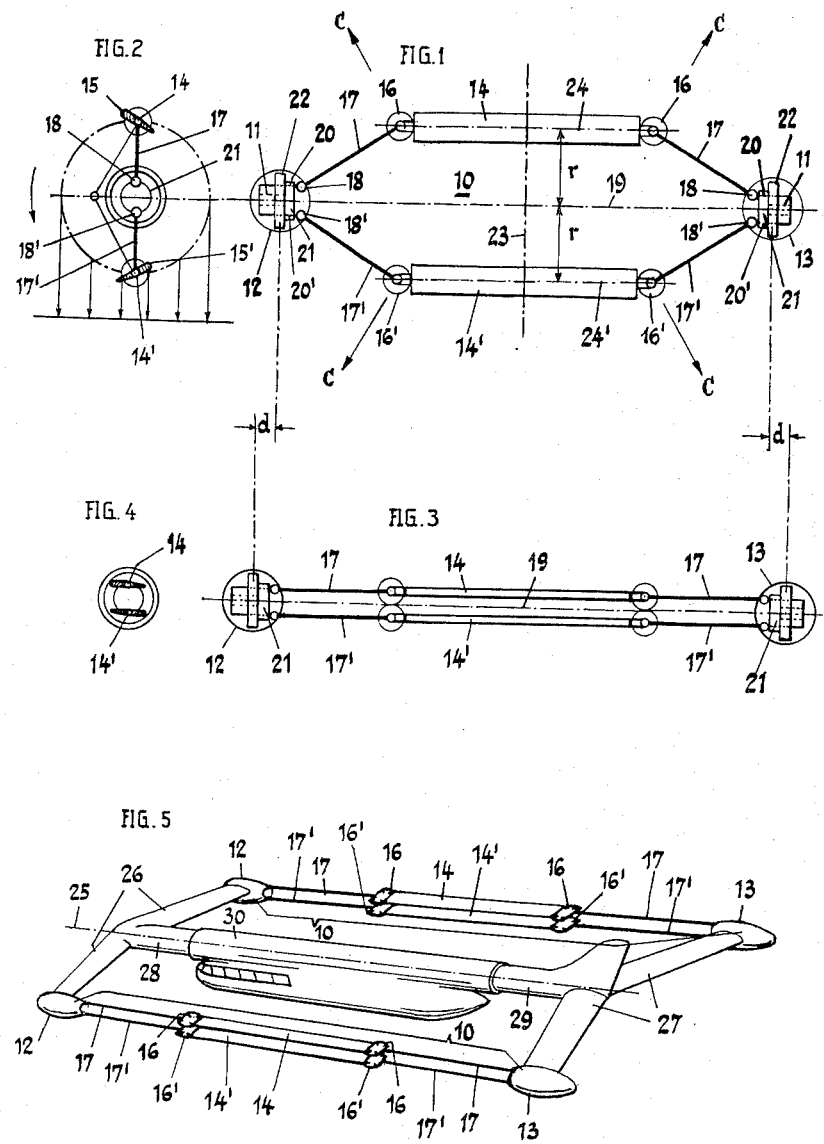

3,231,220
DRIVEN ROTOR-WING SYSTEM FOR AIRCRAFT
Hans W. Fischer, Bernstrasse 153, Steffisburg,
near Thun, Switzerland
Filed Mar. 10, 1964, Ser. No. 350,882
Claims priority, application Switzerland, Mar. 16, 1963,
3,332/63
8 Claims. (Cl. 244—9)

This invention relates to a driven rotor-wing system for an aircraft, the axis of rotation of which extends at least approximately parallel to the longitudinal axis of the aircraft, and comprising at least one rotor blade extending parallel to the said axis, which rotor has its extremities mounted so as to be rotatable about its longitudinal axis according to the known Voith-Schneider principle.

A propeller based on the said principal has hitherto only been applied successfully to water craft. Such a propeller essentially comprises a horizontal plate-like hub mounted on the side of a vertical rotor shaft and carrying a number of axially parallel rotor blades projecting freely from one side of the said plate hub, said blades each having one extremity mounted in the hub so as to be rotatable about their own longitudinal axis, and able to revolve together with the shaft about the axis of the shaft. At the same time, each rotor blade can move relatively about its own longitudinal axis owing to the action of a guide mechanism, this motion causing the angle of incidence of the rotor blade to be changed from zero to positive values and back again to negative values in the course of each full revolution of the shaft. The direction of the zero-setting and the value of the angle of incidence may be varied at will, so that direction and magnitude of the propeller thrust may be adjusted at constant r.p.m.

Irrespective of the surrounding fluid, the Voith-Schneider propeller offers higher efficiency than all other forms of propeller known hitherto. Since the application of the Voith-Schneider principle had however employed this kind of propeller in substantially the known form in earlier experiments, such experiments resulted in unwieldy propeller structures which were complex in construction and required considerable space even when not in operation. Such constructions however had a high total weight and form drag of the propeller so that its application to aircraft was unsuccessful, and it was useless for creating lift. It is clearly inferior, as far as propulsion is concerned, to the conventional propulsion systems employed on aircraft at present.

However, none of the known constructions tested for the generation of lift alone on aircraft had a satisfactory efficiency, but the high efficiency of the Voith-Schneider propeller appears to establish its suitability for this purpose.

The main object of the present invention is to provide a driven rotor-wing system using the said Voith-Schneider principle for aircraft which enables the craft to take off and land vertically and thus overcome the aforesaid disadvantages.

According to the present invention a driven rotor-wing system for use on aircraft, comprises at least one rotor blade extending parallel thereto, this blade having its extremities mounted to rotate by the Voith-Schneider principle about its longitudinal axis, the rotor blades being mounted so that the distance between their longitudinal axes and the rotor axis is adjustable.

In order that the invention may be more clearly understood an embodiment in accordance therewith will now be described by way of example with reference to the accompanying drawing in which:

FIGURE 1 is a diagrammatic side view of a driven rotor-wing system in the operating position;

FIGURE 2 is a cross-section along the chain dotted line in the centre of FIGURE 1;

FIGURE 3 is a predominant view similar to FIGURE 1 of the driven rotor-wing system, in the inoperative position;

FIGURE 4 is a cross-section through the central part of FIGURE 3; and

FIGURE 5 is a perspective view of an aircraft having two driven rotor-wing systems as described with reference to FIGURES 1 to 4.

Referring to the drawings the driven rotor-wing system has a rotor 10 each axial extremity of which has a stub spindle 11 rotatably mounted in a drive casing 12 and 13 respectively. Between and mechanically coupled to the two stub spindles 11, the rotor 10 has two rotor blades 14 and 14′ identical in length and section but having their leading edges 15 and 15′ mounted to face in opposite directions. Each rotor blade 14, 14′ has each of its extremities coupled by a shaft joint 16, 16′ to the corresponding extremity of a tension rod 17, 17′, the other extremity of which is coupled by a shaft joint 18, 18′, to a rotary spindle 20, 20′ mounted parallel to the longitudinal axis 19 of the rotor 10, the rotary spindle being mounted in a plate-like hub 21 disposed sideways on the stub shaft 11. These rotary spindles 20 and 20′ are disposed on the hub 21 on diametrically opposite sides of the rotor axis 19 and are caused to rotate according to the Voith-Schneider principle by a guide or control mechanism 22 mounted on the stub shaft 11, actuated hydraulically for example, and operating synchronously with the control mechanism 22 of the opposite stub shaft 11 of the rotor, so as to vary the angle of incidence.

The tension rods 17 and 17′ are equal in length at both ends of the rotor blades. All four joints 16 and 16′, and the joints 18 and 18′, are of identical construction moreover, preferably in the form of universal joints for example, and are symmetrically disposed relative to the rotor axis 19 and to the transverse plane 23 passing through the middle of the rotor and at right angles thereto, so that the rotor blades 14 and 14′ and their longitudinal axes 24 and 24′ are always positioned parallel to the rotor axis 19. Since in addition to the plate hubs 21 of the rotor 10, with if desired the corresponding drive housing 12 and 13, are identically displaceable axially in opposite directions through a variable distance $d$, the blades 14, 14′ of the rotor and its tension rods 17, 17′ may assume optional operating positions with different distances of the longitudinal axes 24 and 24′ of the blades from the rotor axis 19, between the retracted i.e. inoperative position in FIGURES 3 and 4 and the position of extreme extension (e.g. as in FIGURES 1 and 2). When the rotor 10 is at rest, the blades 14, 14′ may be positioned one above the other along horizontal planes in their inoperative position (FIGURES 3 and 4) by controlling their angle of incidence by the guide mechanism 22, or one beside the other in one and the same horizontal plane containing the rotor axis 19.

This driven rotor-wing system operates so that the rotor blades 14, 14′ are spread apart by displacing the plate hubs 21 towards each other during rotation of the rotor 10, assisted by the centrifugal force C acting on the adequately selected mass of the joints 16, 16′ (FIGURE 1), until an extended position is reached determned for example by controllable abutments (not shown) for the plate hubs 21 in the housings 12, 13; in such an extended position the rotor blades 14, 14′ are adapted to travel at the peripheral speed required for lift, at constant r.p.m. of the rotor. During the extending movement, as well as when the operating position of the rotor has been reached, the control mechanism 22 operates continuously in the sense of producing continual variation of the angle of incidence of the blades 14, 14' according to the Voith-Schneider principle to generate lift. In order to vary the magnitude of the lift, the speed of revolution of the rotor or the extension of the blades, or both, may be varied.

The use of the driven rotor-wing system on an aircraft to generate lift results in minimum form drag if the bladed rotor 10 is mounted with its axis 19 parallel to the direction of travel namely the longitudinal central axis 25 of the aircraft (FIGURE 5). So that the reactive couple acting on the aircraft during the operation of a bladed rotor is counteracted by an equivalent reactive couple, a second bladed rotor is mounted in symmetrical disposition relative to the first on the opposite side of the longitudinal central axis 25 of the aircraft, the rotors being made to counter-rotate in operation. In the construction shown in FIGURE 5, the aircraft has leading and trailing pairs of aerofoils 26, 27 respectively, which have fuselage supports 28 and 29 respectively penetrating into the aircraft fuselage 30 from the front and rear respectively; these fuselage supports are so mounted in the aircraft fuselage that they may be displaced therein telescopically along the direction of the longitudinal central axis 25. The two driven rotor-wing systems of the aircraft are so mounted with their rotors 10 on either side of the fuselage 30, that the drive housings 12 are disposed at the ends of the aerofoil 26, and the other drive housings 13 one at each end of the other aerofoil 27. The rotor 10 is constructed as described with reference to FIGURES 1 to 4. During operation of the rotors 10 to generate lift for vertical ascent or descent of the aircraft (i.e., vertical take-off or landing), the outward movement of the rotor blades 14, 14' is effected for example by retracting the two pairs of aerofoils 26 and 27 with their fuselage supports 28, 29 toward each other into the fuselage 30, the drive housings 12 and 13 of each rotor thereby being made to move nearer to each other and causing the blades to be moved outwardly. The retraction, i.e. inwards movement of the blades may be effected in an analogous manner by displacement in the opposite direction, thereby considerably reducing the form drag of the rotors 10 in a satisfactory manner for horizontal flight of the aircraft (FIGURES 3–5).

In contrast with known constructions for lift-generating devices for aircraft operating independently from the propulsion device of the aircraft, the present invention has the advantage that when the rotor blades of the lift device are not in operation, they are folded together into a retracted position, in which their share of the frontal area of the aircraft is surprisingly small. In addition, the rotor blades 14 and 14', and the tension rods 17 and 17' of similar flat contour for example, act as aerofoils in the retracted position, and thus contribute to reduction in wing loading.

To limit weight and aerodynamic drag, the rotor blades 14 and 14' and tension rods 17, 17' should have a minimum mass, which can be effected satisfactorily by the driven rotor-wing systems of the invention, since the blades and tension rods need not be independently self-supporting, and do not become stabilised like a self-support until the action exerted during rotation by the centrifugal forces C on the joints 16, 16' is performed. These joints must have a mass adequate for this purpose, and are encased in streamlined cowling. In the case of rotor blades of low mass, these can no longer be constructed to resist bending, and will therefore be bent convexly upward under wing loading during rotation, although the joints subjected to centrifugal force during rotation advantageously counteract this flexing. This phenomenon may be minimised by constructing each rotor blade so that its width between the leading and trailing edges is reduced from its longitudinal extremities towards its centre.

The mechanism for the extension and retraction of the rotor blades may be constructed in a conventional manner, e.g., operated hydraulically, in order to perform reciprocal displacement of the leading and trailing fuselage supports 28, 29 within the aircraft fuselage and thus through the pairs of aerofoils 26, 27 the corresponding translatory axial displacement of the rotor plate hubs 21. This axial displacement could alternately be performed for example by swivelling elements mounted between the fuselage and the hubs 21 of the rotor with an appropriate transmission system, or by direct axial displacement of the hubs 21 themselves. Due to the reciprocal and identical displacement at the nose and tail of the aircraft, its centre of gravity retains its position unchanged, which is an advantage in comparison with "pitching wing" aircraft.

The tandem arrangement of the rotor blade drives shown in FIGURE 3 on an aircraft is a simple example of the invention. By virtue of their omnilateral symmetry, the rotor blade drives are highly suitable for use on aircraft. Many variations in the number and disposition of such lift-generating devices are possible.

The efficiency in water of the Voith-Schneider propeller is excellent in comparison with all other propeller-type propulsion systems. It is considered that this also applies aero-dynamically, in respect to its efficiency in air as a fluid. The power requirement of the lifting device described will therefore be smaller than in the known systems for vertical take-off and landing. As a propulsive device however, the invention is not limited to use in aircraft.

I claim:

1. A driven rotor-wing system for aircraft comprising a rotor mountable in an aircraft with its axis of rotation at least substantially parallel to the longitudinal axis of the aircraft, at least one rotor blade on said rotor parallel to the said rotor axis, and means for rotatably mounting each said blade by its end portions on said rotor by the Voith-Schneider principle, means for adjusting each said blade to vary the distance of each said blade from said rotor axis.

2. A driven rotor-wing system for aircraft comprising a rotor mountable in an aircraft with its axis of rotation substantially parallel to the longitudinal axis of the aircraft, at least one rotor blade on said rotor parallel to said rotor axis, rotor hubs mounted in spaced relation longitudinally on said rotor, arms connecting each end portion of each rotor blade to one of said hubs and pivotable relative to the rotor axis to vary the distance of each blade from the rotor axis.

3. A driven rotor-wing system for aircraft according to claim 2, wherein both arms of each rotor blade are connected at their opposite end portions to the rotor hubs and to the blade by joints such as universal joints and means are provided to move the hubs to move each rotor blade from an operative to an inoperative position and vice versa which said blade is maintained parallel to the rotor axis.

4. A driven rotor-wing system according to claim 2, wherein the rotor has at least two rotor blades having their longitudinal axes parallel to and symmetrically disposed with respect to the rotor axis with the same blade faces always directed towards said rotor axis during rotation of the rotor.

5. A driven rotor-wing system according to claim 2, wherein the rotor hubs are axially displaceable relative to each other to move said arms and rotor blades from the operative to the inoperative positions and from the inoperative to the operative positions.

6. A driven rotor-wing system for aircraft comprising a rotor mountable in an aircraft with its axis of rotation substantially parallel to the longitudinal axis of the aircraft, at least one rotor blade on said rotor parallel to said rotor axis, rotor hubs mounted in spaced relation longitudinally on said rotor, arms connecting each end portion of each rotor blade to one of said hubs and pivotable relatively to the rotor axis to vary the distance of each blade from the rotor axis, said rotor blades being of thin flexible construction and the joints coupling the arms to the blades and hubs have a mass at least substantially sufficient to hold the blades extended in the operative position during rotation of the rotor.

7. A driven rotor-wing system according to claim 6 wherein the width of each rotor blade between its leading and trailing edges is reduced between its ends and its central portion.

8. An aircraft incorporating a driven rotor-wing system comprising a rotor mountable in an aircraft with its axis of rotation substantially parallel to the longitudinal axis of the aircraft, at least one rotor blade on said rotor parallel to said rotor axis, rotor hubs mounted in spaced relation longitudinally on said rotor, arms connecting each end portion of each rotor blade to one of said hubs and pivotable relative to the rotor axis to vary the distance of each blade from the rotor axis, the hubs of each rotor being mounted on aerofoils of the aircraft spaced on opposite sides of the longitudinal axis of the aircraft in a plane containing said hubs and said rotor axis.

References Cited by the Examiner

UNITED STATES PATENTS

| | | | |
|---|---|---|---|
| 1,885,640 | 11/1932 | Strandgren | 170—151 X |
| 2,580,428 | 1/1952 | Heuver | 170—148 |
| 2,788,075 | 4/1957 | Pullin | 244—17.21 X |

MILTON BUCHLER, *Primary Examiner.*